Figure 1:
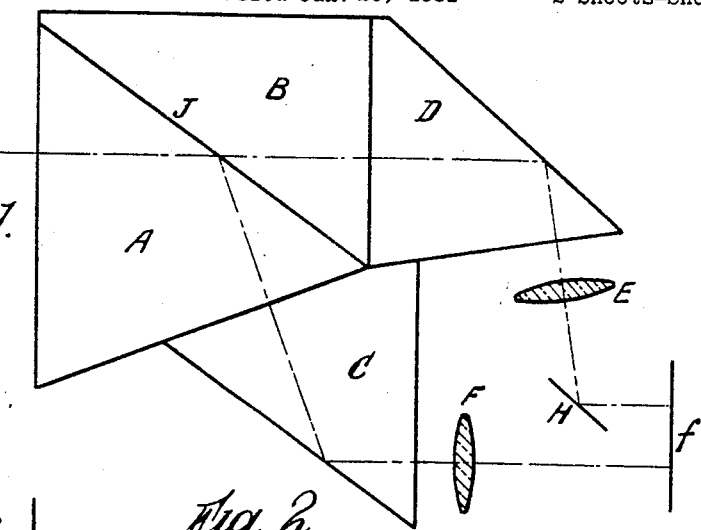

Jan. 5, 1932.  J. H. DOWELL  1,839,955
CAMERA FOR COLOR PHOTOGRAPHY
Filed Jan. 20, 1931  2 Sheets-Sheet 1

Inventor
J. H. Dowell,
By his attorney,
Baldwin + Wight

Jan. 5, 1932.   J. H. DOWELL   1,839,955
CAMERA FOR COLOR PHOTOGRAPHY
Filed Jan. 20, 1931   2 Sheets-Sheet 2

Inventor
J. H. Dowell,
By his attorneys,
Baldwin Wight

Patented Jan. 5, 1932

1,839,955

UNITED STATES PATENT OFFICE

JOHN HENDRI DOWELL, OF LONDON, ENGLAND, ASSIGNOR TO ADAM HILGER LIMITED, OF LONDON, ENGLAND

CAMERA FOR COLOR PHOTOGRAPHY

Application filed January 20, 1931, Serial No. 510,027, and in Great Britain January 18, 1930.

An application for this invention was filed in Great Britain on January 18, 1930.

This invention relates to cameras for color photography in which a prism or combination of prisms is used to form a number of images of equal size free from parallax, each image being formed after transmission through a colored filter, and also to cameras of similar type, such as for kinematography, in which the images are also turned through 90° and cast alongside with the width of the image along the length of the film. Such prisms are usually constructed of glass of the same refractive index throughout, and it is found that the images so formed although of equal size for objects at infinity, are not of equal size for near objects. This invention has for its object means whereby such prisms can be constructed so that the images are all of the same size for objects at all distances.

In a two-color camera, for example, constructed in the usual way the light enters a glass prism normally to a face thereof. It is then divided by an oblique semi-reflecting surface into two beams which are then subjected to total internal reflection. These two beams then emerge from the prism separately and form images on separate plates or films or separate parts of the same plate or film by means of separate objectives. A color filter is usually placed close to each plate or lens to select the appropriate color for each of the two images. It has been found that in such an arrangement the size of the images for near objects differs for light of different color on account of the dispersion of the light passing through the prism at oblique angles.

The lateral shift of an oblique ray of light passing through a parallel sided plate which is the equivalent of the prism system depends on the refractive index and accordingly the light arriving at a particular point on the photographic plate comes from one point of the object in the case of one color and from a point at a finite distance away from the first in the case of another color. This separation subtends a negligible angle at the camera in the case of very distant objects, but with near objects the effect is to produce images of different sizes which do not register satisfactorily in the subsequent processes.

The present invention provides means whereby the sizes of the images separated by the prism system are equal irrespective of the distance of the object from the camera.

According to the invention a beam dividing optical system in or for a camera of the kind referred to comprises a prism system constructed of glass of more than one refractive index, in which the dimensions of the glasses and their relative situation is such that the total lateral shift of rays of the same obliquity of initial incidence corresponding to each of the selected colors is the same.

The glasses should be so dimensioned and located that for both axial and oblique rays the lengths of the optical reduced paths through the system are the same for each of the selected colors.

For complete correction according to the invention a prism system is provided in which the sums $$\frac{L}{N_1} + \frac{L_2}{N_2} + \ldots \text{ and } L_1 \tan r_1 + L_2 \tan r_2 + \ldots$$

in regard to any one selected color taken over the whole of the light path of that color through the prism system are respectively equal to the corresponding arms in regard to the other selected color or colors, $L_1$, $L_2$, etc. being the lengths of light path in the several individual glasses traversed by light of the color in question, $N_1$, $N_2$, etc. the refractive indices of the said glasses for that color, and $r_1$, $r_2$, etc. the angles of refraction of any one oblique ray of light of that color in the said glasses.

In some cases it is convenient to make the mean of the refractive indices of the glass common to the colors for those colors equal to the mean of the refractive indices of the glasses individual to the colors for the respective colors. That is to say in the case of a two color camera, if the glass common to the two colors has refractive indices $N_{R1}$ and $N_{G1}$ for colors R and G respectively, and the glass individual to color R has a refractive index $N_{R2}$ for R and that individual to color G a refractive index $N_{G3}$ for G, then the relation defined above may be expressed thus:—

$$\frac{N_{R1}+N_{G1}}{2} = \frac{N_{R2}+N_{G3}}{2}$$

Similarly in the case of a three color camera using similar conventional designations for the refractive indices, the relation could be expressed:—

$$\frac{N_{R1}+N_{G1}+N_{B1}}{3} = \frac{N_{R2}+N_{G3}+N_{B4}}{3}$$

When this limitation is imposed it is often advantageous to use as glass individual to one color the same kind of glass as is used for the part of the system common to the colors. Thus in the two color case either $N_{R1}=N_{R2}$ or $N_{G1}=N_{G3}$ and in the three color case $N_{G1}=N_{G3}$.

In a preferred form of construction applicable to a two color camera the prism system is built up of three elements of differing refractive indices. A dividing prism of usual type receives light normally to one of its faces, divides it by an oblique internal surface and has two other surfaces by which the separated beams leave the prism normally. Attached to these two surfaces are two further prisms which for convenience may be referred to as the red prism and the green prism, although this form of construction is applicable to any two colors. The mean refractive index of the dividing prism for red and green is equal to the mean of the refractive indices of the red prism for red and of the green prism for green. The path lengths of the red and green prisms differ by approximately equal amounts from a mean length corresponding to the mean refractive index chosen in accordance with the convenience of the design.

In order to obtain good correction for the secondary dispersion the glasses for the red and green prisms will also be chosen so that their dispersions for the wavelength range corresponding to the transmission of the respective color filters associated with them are approximately equal.

In the case of a three color camera, two colors would be provided for as described above and the mean refractive index of the prism for the third color would be equal to the mean refractive index of the dividing prism. The path length of the prism for the third color would be approximately equal to the mean of the two path lengths of the prisms for the first two colors.

The invention is illustrated and explained by the accompanying drawings in which—

Figure 2:
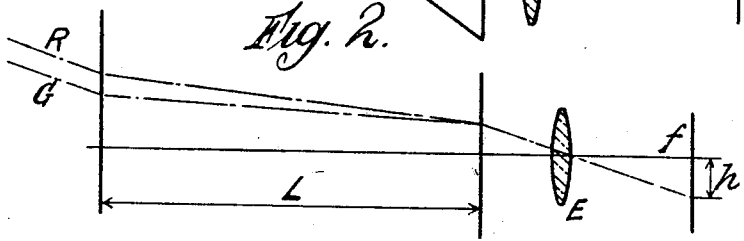
Figure 3:
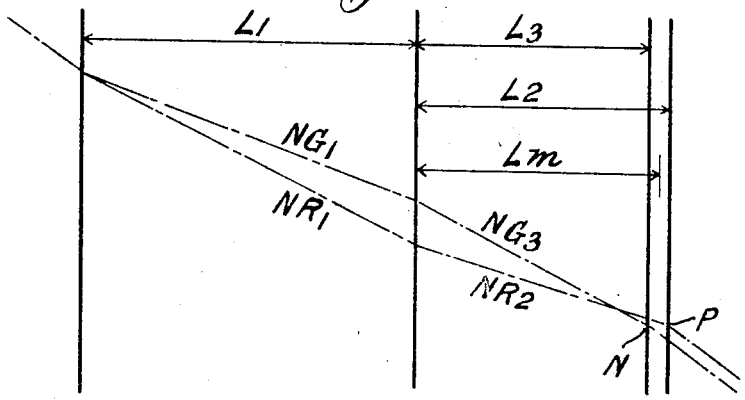
Figure 4:
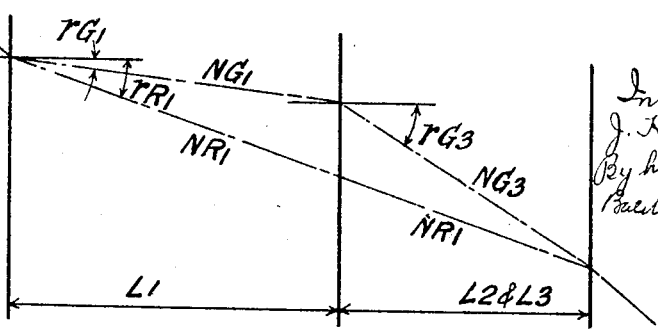
Figure 5:
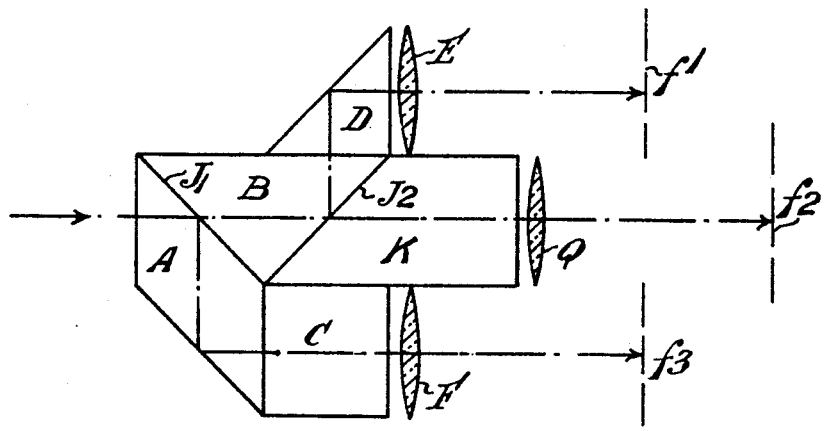
Figure 6:
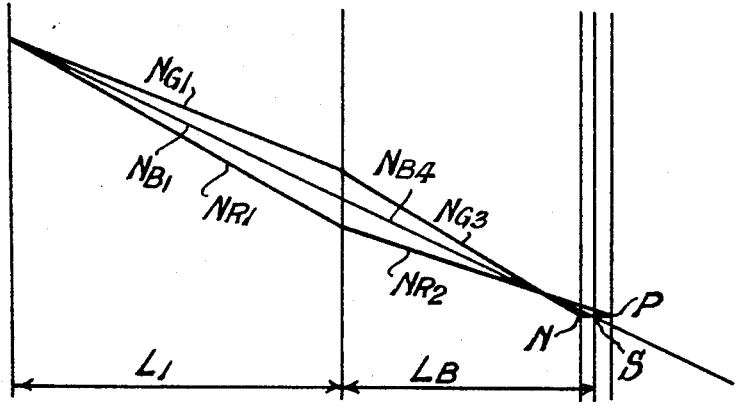

Figure 1 is a diagrammatic section of a prism system for two colors according to the invention, Figures 2, 3 and 4 are explanatory diagrams, Figure 5 is a diagrammatic section of a prism system for three colors, and Figure 6 is an explanatory diagram relating thereto.

A two color camera of the known kind may have its prism system arranged as shown in Figure 1, but such a system has glass of the same refractive properties throughout. Thus A and C would in this case be one prism, and B and D would similarly be one. Light enters the prism AC as shown by the chain dotted line and is divided by the semi-reflecting surface J into two rays each of which is internally reflected once. The rays then pass out and are focused by lenses E and F on to the focal plane $f$, one ray being reflected by the mirror H to render it parallel to the other and similar to it in relation to left and right. Usually a color filter is placed close to the plate or the lens in each of the two rays.

As shown below the size of the image for near objects differs for light of different color on account of the dispersion of the light passing through the prism at oblique angles. Referring to Figure 2 which shows the path of the rays through such an optical system rectified as regards reflection, L represents the thickness of glass path, assumed in this case equal for both rays. $N_R$ is the mean refractive index for the one color and $N_G$ is the mean refractice index for the other. $f$ is the focal plane where the images are formed and E is the lens. If the path of a ray proceeding to a point on each of the pictures at a distance $h$ from the centre, is traced backwards from the image through the optical axis of the lens E, the two paths will, on entering the prism be refracted at different angles depending upon the respective values of $N_R$ and $N_G$ and on emerging from the prism they will become parallel but separated as indicated by the lines R and G. For an object at infinity this separation will be negligible as compared with the size of the object and therefore both pictures will for practical purposes be the same size. If however the object is near to the camera it is evident that each of the rays along these lines will come from a different point on the object, thus causing objects of different sizes to appear on the focal plane of the camera as objects of equal size.

The object of the invention is to overcome this defect and in putting it into practice the following considerations serve to determine the dimensions and refractive indices of the glasses to be used.

Considering first the case of a two color camera, it is highly important that the optical distance from the object to the lens should be exactly equal for both colors and this is secured by proper adjustment of the two glass paths such that $$\frac{L_1}{N_R} = \frac{L_2}{N_G}$$

where $L_1$ is the length of glass for one color and $N_R$ its refractive index for that color and $L_2$ and $N_G$ the corresponding length and refractive index for the other color. Such a system is correct on the axis for objects at all distances but this is not the case for oblique rays. With more than two colors the same conditions hold for all the colors.

The condition necessary for complete correction of magnification at all distances for a two or more color camera are:—

(1) $\Sigma\left(\frac{L}{N}\right)$ for each color is equal.

(2) $\Sigma$ (L tan $r$) for each color is equal where L is the length of glass path.

$N$ is the refractive index.

$r$ is the angle of refraction.

Equation 1 expresses the equality of the optical reduced length for all rays on the optical axis and equation 2 expresses the equality of the total lateral shift for oblique rays.

The conditions for exact correction are stated more specifically below in the case of a two color camera, Figure 3 serving to illustrate the principle. This figure represents the glass path shown as L in Figure 2, but with a prism system according to the invention. In the figure and equations:—

$L_1$ = length of glass common to both colors R and G.

$L_2$ = length of glass exclusive to color R.

$L_3$ = length of glass exclusive to color G.

$N_{R1}$ = refractive index of glass common to both colors corresponding to the mean wavelength of color R.

$N_{G1}$ = refractive index of glass common to both colors corresponding to the mean wavelength of color G.

$N_{R2}$ = refractive index of glass exclusive to color R corresponding to the mean wavelength of color R.

$N_{G3}$ = refractive index of glass exclusive to color R corresponding to the mean wavelength of color G.

$r$ = angle of refraction, the suffixes appended having the same meaning as those appended to N.

The condition for exact correction is then expressed by Equation 1 above which becomes $$\left(\frac{L_1}{N_{R1}} + \frac{L_2}{N_{R2}}\right) = \left(\frac{L_1}{N_{G1}} + \frac{L_3}{N_{G3}}\right) \quad (3)$$

and Equation 2 which becomes $$L_1 \tan r_{R1} + L_2 \tan r_2 = L_1 \tan r_{G1} + L_3 \tan r_{G3} \quad (4)$$

An actual example will serve to show the way in which this method of correction is applied. We may now regard Figure 1 as an example of the optical system of a two color camera constructed in accordance with this invention. Prisms A and B have between them a dividing surface J silvered by known methods so as to reflect and transmit any desired proportion of the light received. The transmitted light passes on to the prism D by which it is reflected towards the lens E. After transmission by the lens the light is reflected by a mirror H to the focal plane $f$ in which one of the images is formed. The light reflected by the surface J is directed towards the prism C by which it is turned towards the lens F and finally brought to a focus in the focal plane $f$ at the desired separation from the image formed by the lens E. Assuming that a suitable glass has been chosen for prisms A and B and also that the general dimensions of the prisms are prescribed as would usually be the case in practice, as follows $N_{R1}$ The refractive index corresponding to the wavelength chosen for the reflected beam = 1.6105.

$N_{G1}$ The refractive index corresponding to the wavelength chosen for the transmitted beam = 1.6195.

$L_1$ The length of glass in prisms A and B common to both colors = 2.50.

It is necessary to decide on any convenient value for the refractive index and length for either prism C or D; alternately a mean length may be prescribed for prisms C and D and the required values for the refractive indices calculated on the assumption that the mean of the refractive index for the two colors in prisms A and B shall be equal to the mean of the refractive index for the two colors in prisms C and D. Or again the refractive index of either prism C or D may be made equal to the refractive index of the corresponding color in prisms A and B.

In this example the second method is adopted, the required refractive indices and lengths being calculated from a mean value.

In this case Formula 4 becomes:

$$\tan r_{R2} = \tan r_m - L_1 \frac{(\tan r_{R1} - \tan r_m)}{L_m}$$

where $r_m$ = mean angle of refraction = $\frac{r_{R1} + r_{G1}}{2}$ $L_m$ = mean of the lengths of glass individual to each color =

$$\frac{L_2 = L_3}{2}$$

Calculating for an incident angle of 10°

$$\therefore r_m = 6° \ 10' \ 21''$$

$\tan r_{R2} = \tan 6° \ 10' \ 21'' -$
$$\frac{2.5(\tan 6° \ 11' \ 23'' - \tan 6° \ 10' \ 21'')}{2}$$
$$= 0.10776 \therefore r_{R2} = 6° \ 9' \ 4''$$

The required value of the refractive index is therefore:—

$$N_{R2} = \frac{N_{R1} \sin r_{R1}}{\sin r_{R2}} = \frac{1.6105 \sin 6° 11' 23''}{\sin 6° 9' 4''}$$

$$N_{R2} = 1.6207$$

and since $r_m$ corresponds to the mean of the refractive indices =

$$\frac{1.6105 + 1.6195}{2} = 1.6150$$

$$1.6150 = \frac{1.6207 + N_{G3}}{2}$$

$$\therefore N_{G3} = (2 \times 1.6150) - 1.6207 = 1.6093$$

The values obtained for $N_{R2}$ and $N_{G3}$ enable Formula (4) to be worked out for as many angles of incidence as appear desirable in order to determine the degree of correction obtained at different angles of oblique rays.

For rays on the optical axis according to Formula (3) and assuming equal lengths of glass individual to each color, $$\frac{L_1}{N_{G1}} + \frac{L_m}{N_{G3}} = \frac{L_1}{N_{R1}} + \frac{L_m}{N_{R2}}$$

$$\frac{2.5}{1.6195} + \frac{2}{1.6093} = \frac{2.5}{1.6105} + \frac{2}{1.6206}$$

$$2.7865 = 2.7864$$

For most practical purposes this would be a sufficiently exact solution, and indicates that the length of glass individual to each color may be made equal. If it is thought desirable to obtain a more exact value for the length of glass individual to each color the procedure for the above example would be as follows according to Formula (3)

$$\frac{L_1}{N_{G1}} + \frac{L_3}{N_{G3}} = \frac{L_1}{N_{R1}} + \frac{L_2}{N_{R2}}$$

$$\frac{2.5}{1.6195} + \frac{L_3}{1.6093} = \frac{2.5}{1.6105} + \frac{L_2}{1.6206}$$

which reduces to $L_3 - .99303 \, L_2 = .01448$ as however $$L_m = \frac{L_3 + L_2}{2} = 2L_2 = 4 - L_3$$

Therefore by substitution $$L_3 - (4 - L_3).99303 = .01448$$
$$L_3 = 2.0003$$
$$\text{and } L_2 = 4 - L_3$$
$$= 1.9997$$

If these values are inserted in Formula (3) in place of $L_m$ exact equality will then be obtained, the most suitable lengths $L_2$ and $L_3$ should however be decided upon taking into consideration the degree of correction obtainable for oblique rays calculated by Formula (4) for as many angles of incidence as seems desirable, and to accept a less perfect correction if necessary for rays on the axis in order to secure a better average correction for all the oblique rays.

Figure 3 represents diagrammatically the rectified light paths of Figure 1 when the above method is used to determine the relations between the various quantities. It will be seen that, for the oblique ray drawn in, the points N, P where the two components finally leave the glass are at the same horizontal level, that is the total lateral shift is the same for both components.

As an example of the third method of calculation referring to Figs. 1 and 4, suppose prisms A, B and C are constructed from the same type of glass so that the refractive index and length of prism D only have to be determined.

We also assume in this example that the prism will utilize only moderate angles of incidence and in this case the tangents of angles in Formula (4) may with sufficient accuracy be replaced by the corresponding values of the refractive index so that $$L_1 N_{R1} + L_2 N_{R1} = L_1 N_{G1} + L_3 N_{G3}$$

$$N_{G3} = N_{R1} - \frac{L_1}{L_m}(N_{G1} - N_{R1})$$

where $L_m = \frac{L_2 + L_3}{2}$ accepting the same values as in the above example $$N_{G3} = 1.6105 - \frac{2.5}{2}(1.6195 - 1.6105)$$

$$= 1.5992$$

For rays on the axis, according to Formula (3)

$$\frac{L_1 + L_2}{N_{R1}} = \frac{L_1}{N_{G1}} + \frac{L_3}{N_{G3}}$$

$$\frac{4.5}{1.6105} = \frac{2.5}{1.6195} + \frac{L_3}{1.5992}$$

$$L_3 = (2.7942 - 1.5436) \, 1.5992 = 2.0$$

so that the glass lengths individual to each color are equal. These values may be further checked by calculating for an oblique ray according to Formula (4), say for an incident ray of 10° corresponding to the following angles of refraction $$r_{G1} = 6° \quad 9' \quad 19''$$
$$r_{R1} = 6° \quad 11' \quad 23''$$
$$r_{G2} = 6° \quad 14' \quad 1''$$

$$L_1 \tan r_{R1} + L_2 \tan r_{R2} = L_1 \tan r_{G1} + L_3 \tan r_{G3}$$
$$4.5 \tan 6° 9' 19'' =$$
$$\quad 2.5 \tan 6° 11' 23'' + 2 \tan 6° 14' 1''$$
$$.48804 = .48807$$

A difference, or residual error of only .00003 which is amply within all practical requirements.

In the case of prism systems for dividing three or more colors a similar procedure may be adopted, suitable values being selected for the glass individual to one color, and the required values for refractive index and length for the other glass individual to each of the other colors calculated by reference to the first color. In most practical cases the smallest number of types of glass will usually be chosen, but it will be clear that any number of types may be employed.

An example of a three color prism system is shown in Figs. 5 and 6. Light enters the prism A and is divided at the semi-reflecting surface $J_1$. The direct part passes through the prism B to a second semi-reflecting surface $J_2$ which again divides this part of the light. The direct part passes through the prism K and is focused by the lens Q on the focal plane $f_2$. The glasses A, B and K are all of the same kind. The rays reflected at the surfaces $J_1$ and $J_2$ are subjected to total reflection in the prisms A and D respectively and pass through glasses C and D to be focused by lenses F and E at $f_3$ and $f_1$ respectively. The two indirect images on $f_3$ and $f_1$ are corrected by glasses C and D the mean of whose refractive indices $N_{R2}$ and $N_{G3}$ for their respective colors is equal to the mean of the refractive indices $N_{R1}$ and $N_{G1}$ for these colors in the glass A common to all colors. The method of procedure is therefore exactly the same as the first example for a two color camera described in connection with Fig. 3 with the addition of the direct image.

If for example, the same particulars are assumed in this case, the mean refractive index 1.6150 would be the value for the refractive index of glass K individual to the direct image, consequently also of glasses A and B for the same color, and it would only be necessary to determine the length of glass required, as follows:—

According to the result obtained from Formula (3) the means reduced path length = 2.78645 so that $$\frac{L_1 + L_B}{N_B} = 2.78645 = \frac{L_1 + L_B}{1.6150} \therefore L_B = 4.5001$$

so that $L_B = 4.5001 - 2.5 = 2.001$

It will be seen from Figure 6, that, just as described in connection with Figure 3, the points N, P and S where the three components of the oblique ray drawn in finally leave the glass are at the same horizontal level, that is the total lateral shift is the same for all three components and consequently the three-images of an object at any distance are of the same size and such as will register satisfactorily in any subsequent process.

What I claim is:—

1. For a camera for color photography a beam dividing optical system corrected for chromatic aberration for near objects comprising a prism in the path of the undivided beam, reflecting means for dividing the light into the required number of beams, and prisms of different refractive indices in the paths of the separated beams, in which the sums $$\frac{L_1}{N_1} + \frac{L_2}{N_2} + \ldots \text{ and } L_1 \tan r_1 + L_2 \tan r_2 + \ldots$$

in regard to any one selected color taken over the whole of the light path of that color through the prism system are respectively equal to the corresponding sums in regard to any other selected color, $L_1$, $L_2$, etc. being the lengths of light path in the several individual glasses traversed by light of the color in question, $N_1$, $N_2$, etc. the refractive indices of the said glasses for that color, and $r_1$, $r_2$, etc. the angles of refraction of any one oblique ray of light of that color in the said glasses.

2. For a camera for color photography a beam dividing optical system corrected for chromatic alteration for near objects comprising a prism in the path of the undivided beam, a light dividing reflector, a prism in the path of the separated beam of longer mean wave length and a prism in the path of the separated beam of shorter mean wave length having a refractive index at that wave length smaller than that of the second-named prism at the longer wave length, the mean of the said two refractive indices being equal to the mean of the refractive indices of the first-named prism at the said two wave lengths.

3. For a camera for color photography a beam dividing optical system corrected for chromatic aberration for near objects comprising a prism in the path of the undivided beam, a light dividing reflector, a prism in the path of the separated beam of longer mean wave length and a prism in the path of the separated beam of shorter mean wave length having a refractive index at that wave length smaller than that of the second-named prism at the longer wave length, the mean of the said two refractive indices being equal to the mean of the refractive indices of the first-named prism at the said two wave lengths, and the total optical length of path and the total lateral shift of an oblique ray being respectively equal as between the two mean wave lengths.

4. For a camera for color photography a beam dividing optical system corrected for chromatic aberration for near objects and constructed of only two kinds of glass which comprises a prism in the path of the undivided beam, a light dividing reflector, a prism in the path of the separated beam of longer mean wave length and a prism in the path of the separated beam of shorter mean wave length having a refractive index at that wave length smaller than that of the second-named prism at the longer wave length, the mean of the said two refractive indices being equal to the mean of the refractive indices of the first-named prism at the said two wave lengths, and the first-named prism being of the same kind of glass as one of the other two prisms.

5. For a camera for color photography a beam dividing optical system corrected for chromatic aberration for near objects comprising a prism in the path of the undivided beam, light dividing reflectors, a prism in the path of the separated beam of longest mean wave length, a prism in the path of the separated beam of shortest mean wave length having a refractive index at that wave length less than the refractive index of the prism in the path of the beam of longest mean wave length at the latter wave length, a prism in the path of the separated beam of intermediate mean wave length having a refractive index at the said wave length intermediate between the two afore-mentioned refractive indices, the mean of the three said refractive indices of the prisms in the paths of the three separated beams being equal to the mean of the three refractive indices of the prism in the path of the undivided beam at the three mean wave lengths considered.

6. For a camera for color photography a beam dividing optical system corrected for chromatic aberration for near objects comprising a prism in the path of the undivided beam, light dividing reflectors, a prism in the path of the separated beam of longest mean wave length, a prism in the path of the separated beam of shortest mean wave length having a refractive index at that wave length less than the refractive indices of the prism in the path of the beam of longest mean wave length at the latter wave length, a prism in the path of the separated beam of intermediate mean wave length having a refractive index at the said wave length intermediate between the two afore-mentioned refractive indices, the mean of the three said refractive indices of the prisms in the paths of the three separated beams being equal to the mean of the three refractive indices of the prism in the path of the undivided beam at the three mean wave lengths considered, and the total optical length of path and the total lateral shift of an oblique ray being respectively equal as between the three mean wave lengths.

7. For a camera for color photography a beam dividing optical system corrected for chromatic aberration for near objects and constructed of only three kinds of glass which comprises a prism of the first kind of glass in the path of the undivided beam, light dividing reflectors, a prism of the same kind of glass in the path of the separated beam of intermediate mean wave length, a prism of the second kind of glass in the separated beam of the longest mean wave length and a prism of the third kind of glass in the separated beam of the shortest mean wave length, and in which the refractive index of the second kind of glass at the longest mean wave length is greater and that of the third kind of glass at the shortest mean wave length is less than that of the first kind of glass at the intermediate mean wave length and the mean of the said three refractive indices is equal to the mean of the refractive indices of the first kind of glass at the three mean wave lengths in question.

In testimony that I claim the foregoing to be my invention, I have signed my name this 1st day of January 1931.

JOHN HENDRI DOWELL.